US009084972B2

(12) United States Patent
Isenberg et al.

(10) Patent No.: US 9,084,972 B2
(45) Date of Patent: Jul. 21, 2015

(54) MULTIPLE OPENING RENNET INJECTION SYSTEM

(75) Inventors: Timothy J. Isenberg, Marshfield, WI (US); John E. Zirbel, Marshfield, WI (US)

(73) Assignee: Cheese & Whey Systems, Inc., Marshfield, WI (US)

( * ) Notice: Subject to any disclaimer, the term of this patent is extended or adjusted under 35 U.S.C. 154(b) by 781 days.

(21) Appl. No.: 13/089,036

(22) Filed: Apr. 18, 2011

(65) Prior Publication Data

US 2011/0252979 A1 Oct. 20, 2011

Related U.S. Application Data

(60) Provisional application No. 61/325,612, filed on Apr. 19, 2010.

(51) Int. Cl.

| | |
|---|---|
| ***A01J 11/00*** | (2006.01) |
| ***B01F 7/04*** | (2006.01) |
| ***B01F 7/00*** | (2006.01) |
| ***B01F 7/02*** | (2006.01) |
| *B01F 15/00* | (2006.01) |

(52) U.S. Cl.

CPC ............. *B01F 7/042* (2013.01); *B01F 7/00275* (2013.01); *B01F 7/022* (2013.01); *B01F 7/00283* (2013.01); *B01F 15/00714* (2013.01)

(58) Field of Classification Search

USPC ........... 99/452, 453, 456, 458, 459, 460, 462, 99/465, 466; 366/147, 149, 297–301, 366/325.1, 325.2, 325.3, 325.4, 325.5, 366/325.6, 325.7, 325.8, 325.9, 325.91, 366/325.92, 325.93, 325.94; 426/7, 34, 36, 426/38, 39, 40, 41, 42, 43, 61, 63, 452, 478, 426/490, 491, 531, 580, 581, 582, 583, 656, 426/657, 665; 239/548

See application file for complete search history.

(56) References Cited

U.S. PATENT DOCUMENTS

| | | | |
|---|---|---|---|
| 3,451,327 | A | 6/1969 | Nelson |
| 3,751,010 | A | 8/1973 | Latinen |
| 3,988,112 | A | 10/1976 | Johansson et al. |
| 4,468,127 | A | 8/1984 | Agosta |
| 4,898,745 | A | 2/1990 | Zamzow et al. |
| 4,989,504 | A | 2/1991 | Jay |
| 5,180,604 | A | 1/1993 | Crane et al. |
| 5,753,282 | A | 5/1998 | Tortosa |
| 6,079,323 | A | 6/2000 | Dzenis |
| 6,082,889 | A | 7/2000 | Tortosa |
| 6,655,827 | B1 | 12/2003 | Tortosa |
| 2008/0127834 | A1 | 6/2008 | Bokelmann et al. |

FOREIGN PATENT DOCUMENTS

| | | |
|---|---|---|
| GB | 2220554 | 1/1990 |
| WO | 2004041693 | 5/2004 |

*Primary Examiner* — Dana Ross
*Assistant Examiner* — Joseph Iskra
(74) *Attorney, Agent, or Firm* — Boyle Fredrickson, S.C.

(57) ABSTRACT

A rennet injection system is provided for use with food processing or other equipment that uses rennet as a processing ingredient. The rennet injection system includes at least one injector that has multiple openings for delivering rennet to multiple rennet delivery locations that are spaced apart from each other within the food processing or other equipment. The injector may include a nozzle with a middle bore and angled bores on opposing sides of the middle bore that face away from a direction that the middle bore faces.

17 Claims, 5 Drawing Sheets

MULTIPLE OPENING RENNET INJECTION SYSTEM

CROSS-REFERENCE TO RELATED APPLICATIONS

This application claims priority from U.S. Provisional Patent Application Ser. No. 61/325,612 filed on Apr. 19, 2010, the entirety of which is expressly incorporated by reference herein.

BACKGROUND OF THE INVENTION

1. Field of the Invention

The invention relates to food processing vats and, more particularly, to food processing vats that use rennet during processing.

2. Discussion of the Related Art

Using rennet to make food products is known. Rennet is commonly used during certain cheese making processes. Systems are known that use a tube to introduce rennet into cheese vats.

SUMMARY OF THE INVENTION

The inventors have recognized that in typical food processing vats in which rennet is used as a processing ingredient, for example, in cheese vats, processing time of vat contents can vary as a function of variability in an amount of time required to suitably or fully mix the rennet with the vat contents. The inventors have further recognized that the amount of time for the rennet to fully mix with the vat contents can vary substantially from batch to batch due to variations in the consistency and other characteristics of the vat contents. The inventors have yet further recognized that known methods of placing rennet into a single or few locations within the vat may require substantial amounts of mixing or stirring to distribute the rennet through the contents. The present invention contemplates a rennet injection system for a food processing vat or other rennet-using equipment that addresses at least some of these inventor-identified problems and drawbacks of the prior art.

In accordance with an aspect of the invention, a rennet injection system is provided that may be used with a food processing vat, such as a cheese vat, or other food processing or other machine in which rennet is used as an ingredient. The rennet injection system includes an injector that receives rennet from a rennet supply line and has multiple openings facing different directions into a food processing vat or other equipment. Rennet flows out of the multiple openings of the injector so the rennet is delivered to multiple rennet delivery locations that are spaced apart from each other within the vat or other equipment. This may promote rapid mixing of the rennet into the contents that is being processed in the vat or other equipment.

In accordance with another aspect of the invention, the rennet injection system includes multiple injectors, each of which has multiple openings. In this regard, the rennet injection system delivers rennet to more rennet delivery locations within the vat or other equipment than the number of injectors that is provided within the system. The injectors may be positioned with respect to each other so that their openings collectively deliver the rennet transversely across and longitudinally along the vat or other equipment, defining a rennet receiving area having a length and a width. This wide dispersion of the rennet at its initial delivery into the vat or other equipment may promote rapid mixing of the rennet into the contents being processed.

In accordance with another aspect of the invention, the multiple injectors collectively deliver the rennet in a pattern that is generally evenly distributed through the rennet receiving area. The pattern may include a column of rennet delivery locations that are longitudinally aligned with each other. The pattern may include a row of rennet delivery locations that are transversely aligned with each other. The rennet injection system may be implemented in a cheese vat and the rennet receiving area may include rennet delivery locations that are generally aligned with a center-line of the vat, and/or the rennet receiving area may include rennet delivery locations that are spaced closer to an agitator shaft(s) extending through the vat than to a center-line of the vat; optionally, at least some of the rennet delivery locations may be directly aligned with the shaft(s). This may also promote rapid mixing of the rennet into the vat contents.

In accordance with another aspect of the invention, the injector includes a nozzle that has multiple bores and the multiple openings are defined at respective ends of the bores. Each nozzle may include (i) a middle bore that extends longitudinally through the nozzle, and (ii) an angled bore that extends angularly through the nozzle. A pair of angled bores may extend through the nozzle on opposing sides of and extending in different directions with respect to the middle bore. The angled bores may each define an angle of about 45 degrees with respect to the middle bore of the nozzle. This may promote dispersion of the rennet through the vat at its initial delivery and may promote rapid mixing of the rennet into the vat contents.

In accordance with another aspect of the invention, the vat in which the rennet injection system is provided includes a top wall, and the injectors are connected to the top wall. The injectors may be mounted to the top wall so that they are spaced from each other and are aligned with the center-line of the vat. The injectors may deliver rennet (i) substantially along the vat center-line, and (ii) on opposing sides of the vat center-line. The rennet that is delivered on opposing sides of the vat center-line may be delivered to locations that are spaced substantially the same distance from the vat center-line. The injectors may be mounted to the top wall of the vat and have their openings positioned so that a column of spaced-apart rennet delivery locations is defined substantially near or over each agitator shaft of a pair of agitator shafts extending through the vat. The injectors may be arranged to provide at least three columns of longitudinally spaced-apart rennet delivery locations. Respective rennet delivery locations of the at least three columns may align with each other and define rows of transversely spaced-apart rennet delivery locations. This may promote dispersion of the rennet through the vat at its initial delivery and may promote rapid mixing of the rennet into the vat contents.

In accordance with another aspect of the invention, distances between the longitudinally spaced-apart rennet delivery locations within the columns are generally the same as distances between the transversely spaced-apart rennet delivery locations within the rows. This may distribute the rennet substantially evenly across a rennet receiving area of the vat which is defined generally by outermost positioned columns and rows of the rennet delivery locations, which may promote rapid mixing of the rennet into the vat contents.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
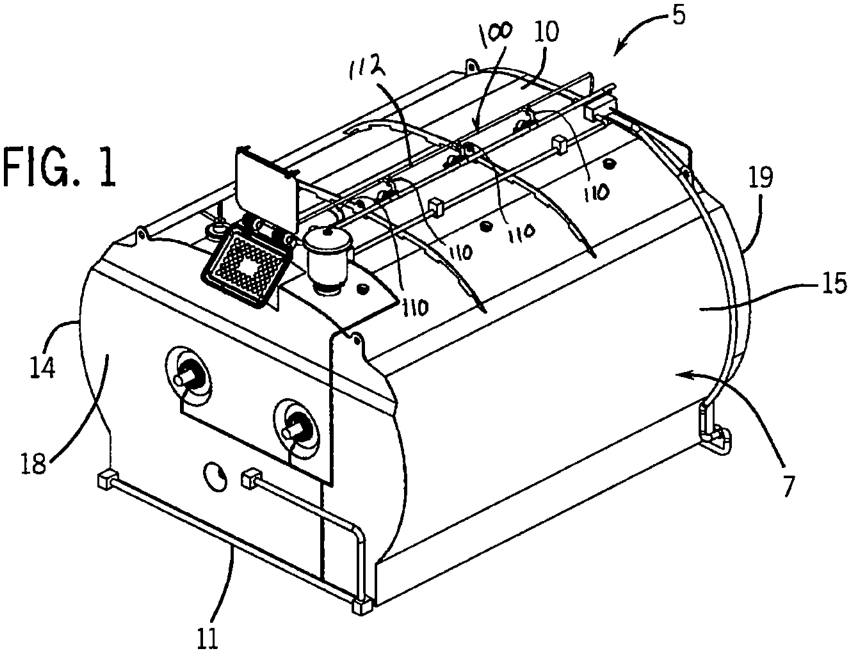
FIG. 1 is an isometric view from above and in front of a vat system incorporating a rennet injection system in accordance with the present invention.
Figure 2:
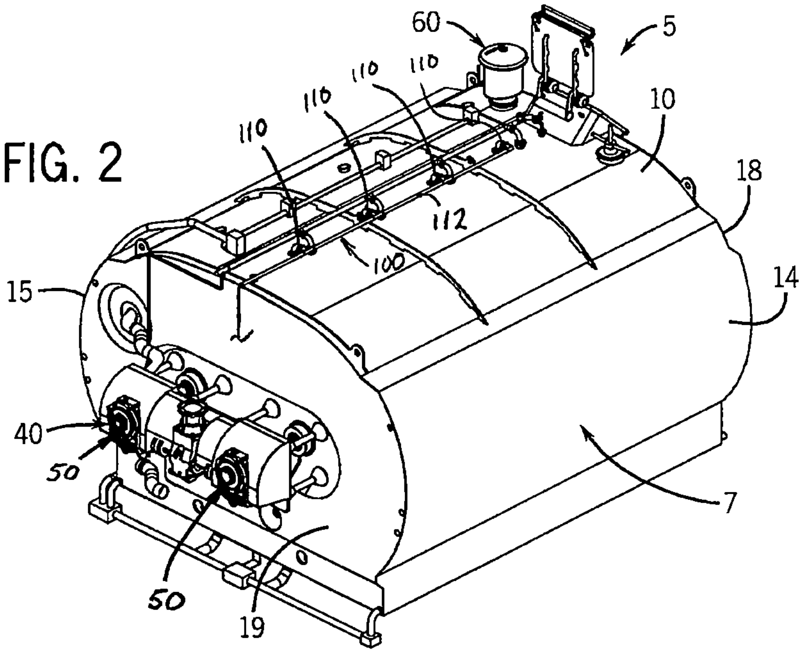
FIG. 2 is an isometric view from above and in back of the vat system of FIG. 1.

FIGS. 1 and 2 illustrate a rennet injection system 100 being implemented within a vat system 5. Vat system 5 can be used for processing food and related products (collectively referred to as "vat contents") by mechanically manipulating and heating or cooling the vat contents 9 (FIG. 4), depending on the particular food or related product being processed. In a representative application, the vat system 5 may be used in the production of cheese, although it is understood that the vat system 5 may be used in processing other types of food and/or other products in which rennet is used during its processing.

Still referring to FIGS. 1 and 2, the system 5 includes a vat 7 that has an agitation system 40 which performs the mechanical manipulations tasks by using a motor that delivers power to a pair of drives 50 (FIG. 2) to rotate a pair of shafts 45 (FIG. 4) upon which blade assemblies are mounted, and a zoned heat transfer system to perform such heating and/or cooling to provide zoned temperature control to the vat 7.

Vat 7 defines an enclosure having a top wall 10, a bottom wall 11, and side walls 14, 15, all of which extend longitudinally between a pair of end walls 18 and 19. The walls 10, 11, 14, 15, 18, 19 are multilayered, having an outer jacket 20 and an inner shell 25 that are spaced from each other. Insulation and various components of the zoned heat transfer system are housed between the jacket 20 and shell 25. The shell 25 is the inmost structure of the vat 7, so that its inner surface surrounds and defines an outer periphery of a void or inside space 8 within the vat 7. A lower part of the inside space 8 resembles two horizontal parallel cylinders that transversely intersect each other, being defined by a lower portion of the shell 25 that has a pair of arcuate depressions which extend along the length of the vat 7, on opposing sides of a longitudinally extending raised middle segment. From the lower portion of the shell 25, opposing side portions extend in an outwardly bowed manner arching away from each other in a transverse direction of the vat 7. An upper portion of the shell 25 arcs gradually between side portions of the shell 25 and defines an upper perimeter of the inside space 8 of vat 7.

Still referring to FIGS. 1 and 2, rennet injection system 100 is configured to deliver rennet across a largely dispersed area with respect to an upper surface of the vat contents 9 (FIG. 4), so that the vast dispersion promotes rapid mixing of the rennet into the vat contents 9. Rennet injection system 100 includes injectors 110 and a rennet supply line 112 that delivers rennet to injectors 110. The rennet supply line 112 is connected to a known rennet delivery system (including suitable plumbing components, hardware components, and controls) that is configured to deliver rennet automatically at a predetermined time(s) during a processing cycle, and/or as manually commanded by an operator of the vat system 5.

Figure 3:
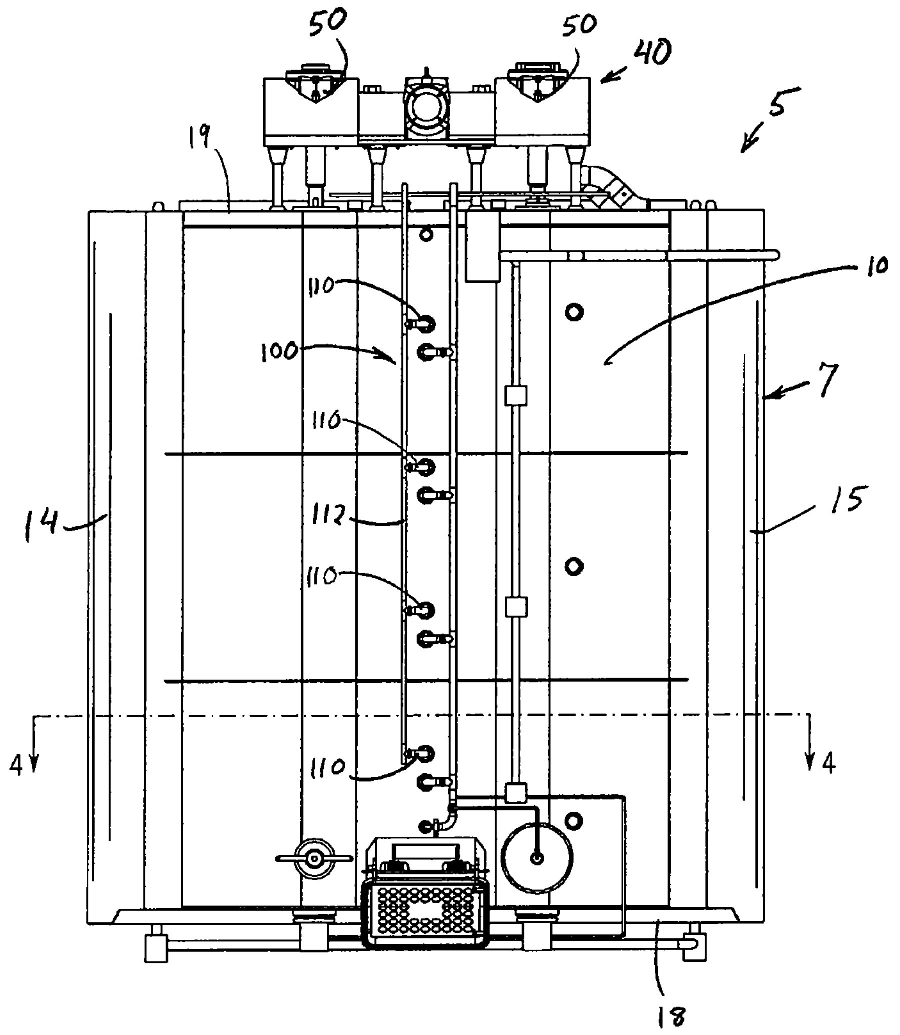
FIG. 3 is a top plan view of the vat system of FIG. 1.

Referring now to FIGS. 1, 2, and 3, in this embodiment, four injectors are mounted to the vat top wall 10. Upon the top wall 10, the injectors 110 are spaced from each other and provided along a center-line of the vat 7, which is defined along a longitudinal axis extending between the end walls 18 and 19. Shown best in FIGS. 4 and 5 and explained in greater detail elsewhere herein, in this embodiment, each of the injectors 110 is configured to deliver rennet to multiple outer and intermediate rennet delivery locations 185, 195 that are spaced apart from each other within the vat 7. This allows the rennet injection system 100 to deliver rennet to a greater number of discrete rennet delivery locations 185, 195 within the vat 7 than the number of injectors 110 within the system 100.

Figure 6:
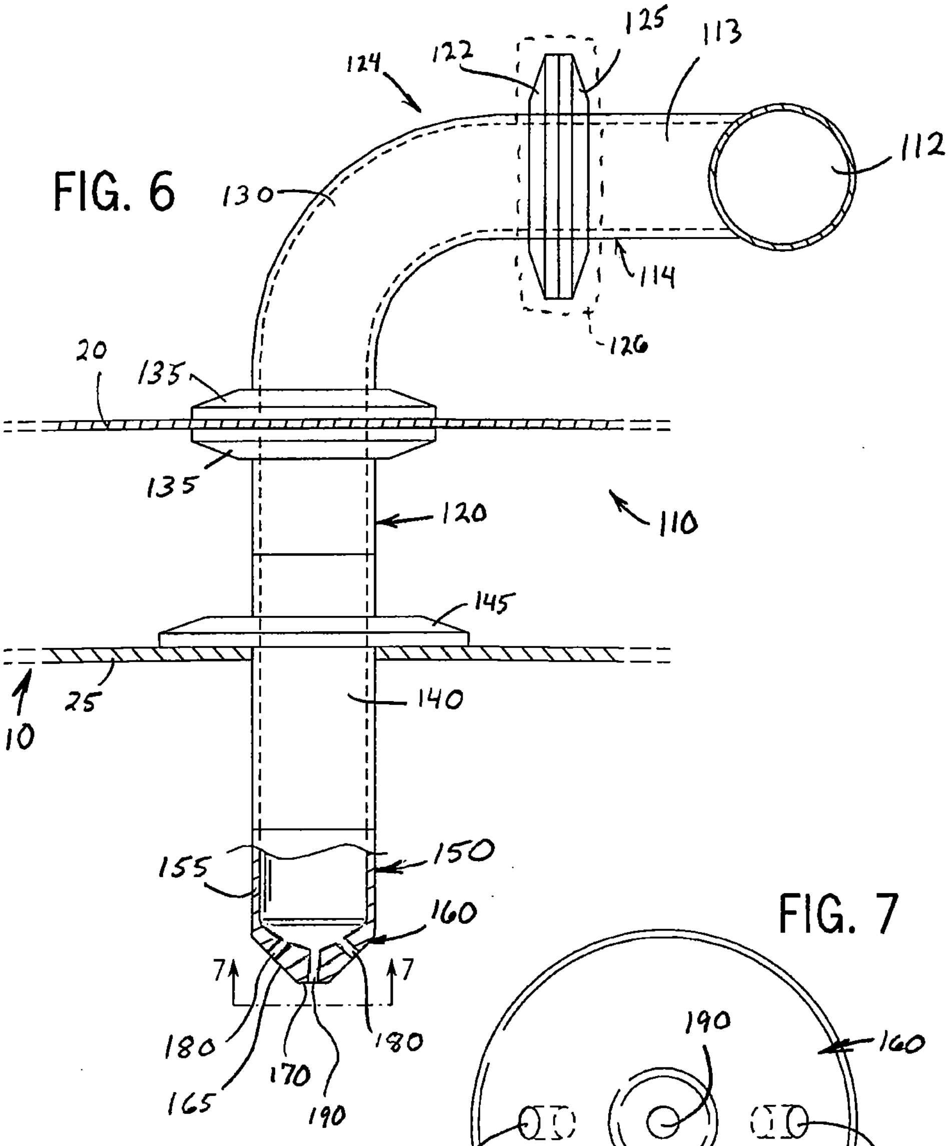
FIG. 6 is a front elevation of the injector of FIG. 4, taken at the curved line 6-6 of FIG. 4.

Referring now to FIG. 6, each injector 110 includes a body 120 that directs the rennet through the injector 110 and a nozzle 150 that delivers the rennet out of the injector 110. A flange 122 is connected to an upper end 124 of the body 120. Another flange 125 extends from an end 114 of a section of tube 113 of the rennet supply line 112. The flanges 122 and 125 of the injector 110 and rennet supply line 112 are releasably connected to each other with a clamp 126 that holds the flanges 122, 125 in face-to-face communication, so as to seal the connection between the injector 110 and rennet supply line 112. This connection may include a gasket (not shown) between the flanges 122, 125 that is compressed by the clamp 126 holding the flanges 122, 125 together.

Still referring to FIG. 6, from the flange 122, the upper end 124 of body 120 extends outwardly then curves about 90 degrees through a curved section 130 that transitions to a downwardly extending straight section 140 that passes through the top wall 10 of the vat. A pair of flanges 135 extends radially from the body 120, near the intersection of the curved section 130 and downwardly extending straight section 140 of the body 120. The pair of flanges 135 sandwiches the jacket 20 or outer layer of the top wall 10 between them. A lower flange 145 is provided below the pair of flanges 135 and extends radially from the downwardly extending straight section 140, closer to the pair of flanges 135 than to the nozzle 150. The lower flange 145 connects to the shell 25 or inner layer of the top wall 10, whereby the flanges 122, 125, 135, and 145 provide three mounting interface locations at which the body 120 of the injector 110 connects to the vat system 5.

Figure 7:
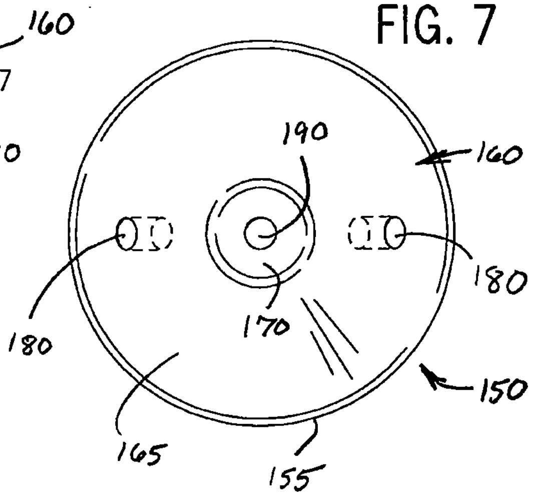
FIG. 7 is a bottom view of a nozzle of the injector of FIG. 6, taken at line 7-7 of FIG. 6.

Referring now to FIGS. 6 and 7, nozzle 150 extends downwardly from an end of the body 120, so that it is positioned in the inside space 8 of vat 7. Nozzle 150 includes a circumferential side wall 155 and an end 160 that has a tapered wall 165 and a flat tip 170. The tapered wall 165 increases in thickness as it extends from the side wall 155 to the flat tip 170. Angled bores 180 extend generally orthogonally through the tapered wall 165. The angled bores 180 extend at an angle of (i) about 90 degrees with respect to each other and (ii) each at an angle of about 45 degrees with respect to a longitudinal axis of the nozzle 150. A middle bore 190 extends along the longitudinal axis of the nozzle 150 and centrally through the flat tip 170. In this embodiment, each of the angled and middle bores 180, 190 has a diameter of about 5/64 inch, although it is understood that the bores 180, 190 may have any other satisfactory dimension as desired.

Figure 4:
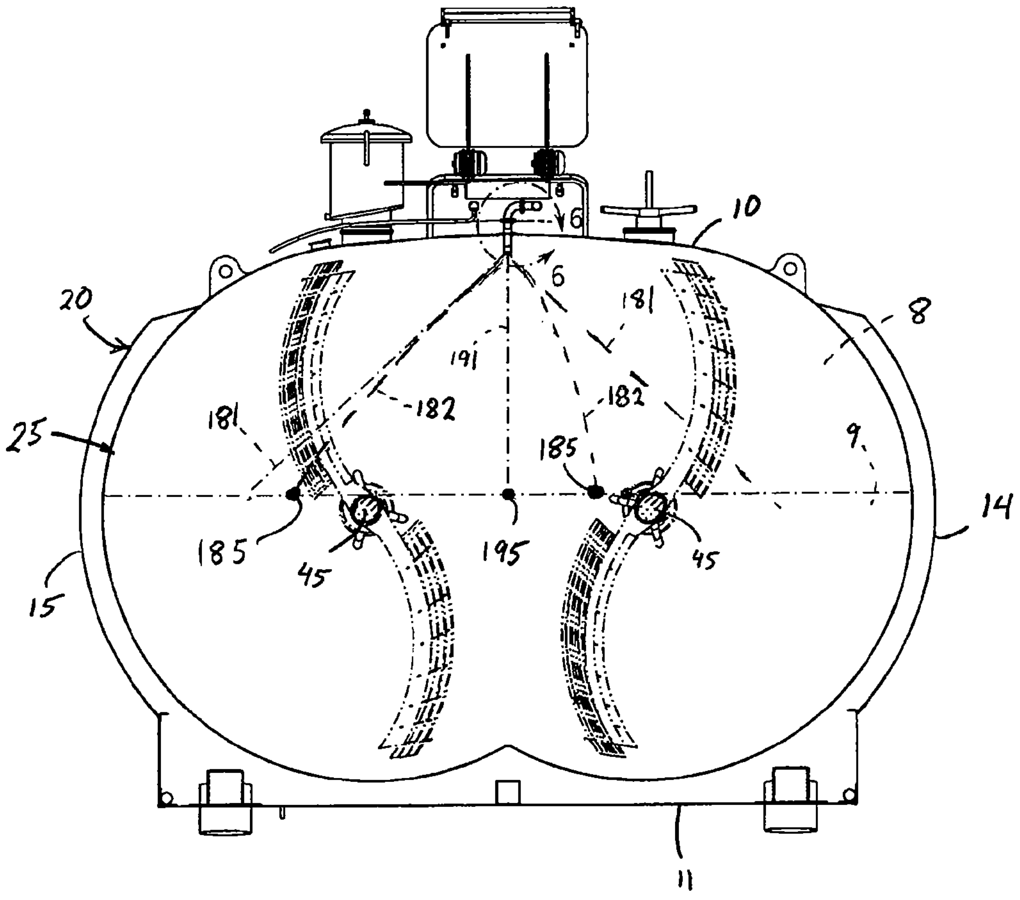
FIG. 4 is a sectional view of the vat system of FIG. 1, taken at line 4-4 of FIG. 3.

Referring now to FIGS. 4 and 6, in this embodiment, the injectors 110 are positioned so that the nozzle middle bore 190 (FIG. 6) opens in a direction that is substantially straight down and the angled bores 180 (FIG. 6) open in directions that extend angularly and transversely across the inside space 8 of the vat 7. As shown in FIG. 4, the direction that the middle bore 190 faces is represented by the dashed line 191 and directions that the angled bores 180 face are represented by the dashed lines 181. The angled bores 180 deliver rennet along dashed line represented flow paths 182 that diverge downwardly away from the facing directions 181 of the angle bores 180, impacting the vat contents 9 at outer rennet delivery locations 185. The middle bore 190 delivers rennet along a flow path that extends substantially along the facing direction 191 of the middle bore 190, impacting the vat contents 9 at an intermediate delivery location 195.

Still referring to FIG. 4, the left-hand side of the vat 7 shows a rennet flow path 182 that extends over the shaft 45 that is closest to wall 15. This may be achieved by the injection system 100 providing a driving pressure for the rennet that is sufficient to deliver the rennet along a flow path 182 that generally follows the facing direction 181 from the angled bore 180 that opens toward wall 15, so that the rennet impacts the vat contents 9 at an outer rennet delivery location 185 that is transversely spaced outwardly of the respective shaft 45. The right-hand side of the vat 7 shows a rennet flow path 182 that does not extend to the shaft 45 that is closest to wall 14. This may be achieved by the injection system 100 providing a driving pressure for the rennet that is relatively lower that that described above with respect to the left-hand side of the vat 7. The driving pressure of the rennet is selected to deliver the rennet along a flow path 182 that diverges from the facing direction of the angled bore 180 that opens toward wall 14, near the injector 110. In this way, the rennet falls short or is delivered transversely inside of the shaft 45 so that the rennet impacts the vat contents 9 at an outer rennet delivery location 185 that is transversely spaced inwardly of the respective shaft 45. In another embodiment, the driving pressure of the rennet may be selected so as to deliver the rennet to outer rennet delivery locations 185 that are substantially on top of or substantially aligned with the shaft(s) 45.

Figure 5:
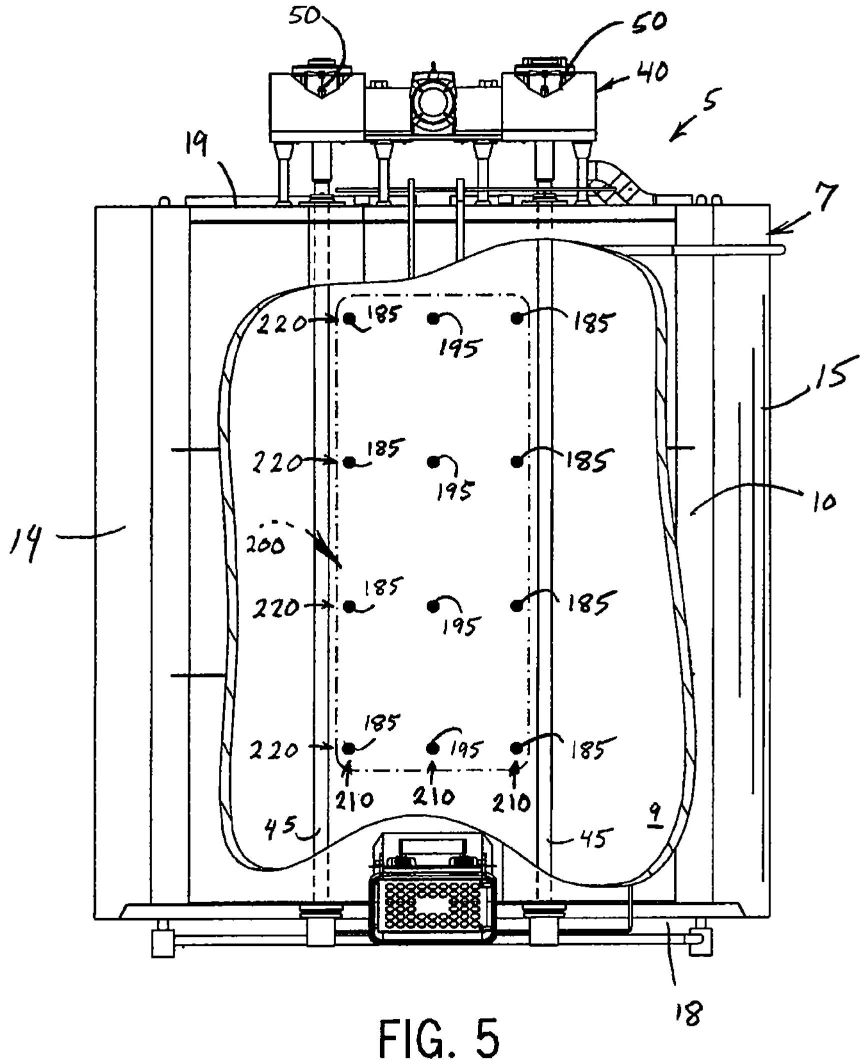
FIG. 5 is a top plan view in partial cut-away of the vat system of FIG. 1.

Referring now to FIGS. 3 and 5, in this embodiment, the middle bores 190 (FIG. 6) of the injectors 110 are positioned over and deliver rennet toward a center-line of the vat 7, between the shafts 45. Shown best in FIG. 5, this provides intermediate rennet delivery locations 195 that are spaced from each other, longitudinally with respect to the vat 7, and being substantially aligned upon the center-line of the vat 7. FIG. 5 shows outer rennet delivery locations 185 that are inside of shaft(s) 45, which may be established by delivering the rennet according along the flow path 182 nearest wall 14 in FIG. 4. Regardless of the particular locations of the rennet delivery locations 185, 195, the nozzles 150 are configured to deliver the rennet to multiple discrete locations that are spaced from each other throughout the inside space 8 of the vat 7. The outermost positioned rennet delivery locations 185, 195 define a perimeter about a rennet receiving area 200, having a length and a width (FIG. 5).

Referring now to FIG. 5, the rennet receiving area 200 includes columns 210 that are defined by rennet delivery locations 185, 195 that are substantially aligned with each other in a longitudinal direction through the void space 8 of vat 7. Lengths of columns 210 generally define the length of the rennet receiving area 200. Rows 220 are defined by rennet delivery locations 185, 195 that are substantially aligned with each other in a transverse direction through the void space 8 of vat 7. Widths of the rows 220 generally define the width of the rennet receiving area 200. In this embodiment, the rennet receiving area 200 has three columns 210 and four rows 220.

It is understood, however, that the receiving area 200 may have any number of columns 210 and rows 220, so long as the injectors 110 disperse the rennet to a sufficiently large area so that the vast dispersion promotes rapid mixing of the rennet into the vat contents 9. In one embodiment, the rennet receiving area occupies at least about 30 percent, plus or minus 5 percent, of a total surface area defined across the vat contents 9. In another embodiment, the rennet receiving area occupies at least about 50 percent, plus or minus 5 percent, of a total surface area defined across the vat contents 9. In yet another embodiment, the rennet receiving area occupies at least about 15 percent, plus or minus 5 percent, of a total surface area defined across the vat contents 9. Distributing the rennet across such large surface areas of the rennet receiving area 200 may promote rapid mixing of the rennet into vat contents that is being processed into the vat.

Various alternatives and embodiments are contemplated as being within the scope of the following claims particularly pointing out and distinctly claiming the subject matter regarded as the invention.

We claim:

1. A rennet injection system for use with a food processing vat comprising:

a rennet supply line directing rennet toward a vat configured for processing food, the rennet supply line extending generally parallel to and outside of a wall of the vat, wherein the wall has a surface defining an inner surface of the vat; and multiple injectors wherein each has an injector body with a first portion and an opposing second portion, wherein the first portion of each injector body is connected to the rennet supply line at a connection location and is configured to receive rennet from the rennet supply line and wherein the second portion of each injector body has multiple openings that face different directions into the vat and through which rennet is delivered out of the injector and into the vat, wherein the multiple openings of the second portion of each injector body are aligned with each other along one of a longitudinal direction and transverse direction with respect to the vat and are configured and arranged to deliver rennet to multiple rennet delivery locations that are spaced apart from each other within the vat, wherein each injector body extends through the wall of the vat, wherein the multiple openings of the second portion of each injector body and the rennet supply line are arranged on opposing sides of the wall of the vat, wherein the connection location between the first portion of the injector body and the rennet supply line is arranged outwardly of the inner surface of the vat, wherein the multiple openings of the second portion of the injector body are arranged inwardly of the inner surface of the vat, wherein the multiple injectors are aligned with each other along the other one of longitudinal direction and transverse direction with respect to the vat with the multiple injectors configured to collectively deliver rennet into a rennet receiving area in a pattern that is generally evenly distributed through the rennet receiving area defined by columns and rows of rennet delivery locations corresponding to the alignment of the multiple injectors with respect to each other and the alignment of the multiple openings of the second portion of each injector body.

2. The rennet injection system of claim 1, wherein a length the rennet receiving area corresponds to a distance between a pair of the multiple injectors that are spaced furthest from each other.

3. The rennet injection system of claim 2, wherein the rennet receiving area includes rennet delivery locations that are generally aligned with a center-line of the vat.

4. The rennet injection system of claim 2, wherein the rennet receiving area includes outer rennet delivery locations that are spaced closer to an agitator shaft extending through the vat than to a center-line of the vat.

5. The rennet injection system of claim 1, the injector further comprising a nozzle that includes multiple bores and wherein the multiple openings are defined at the ends of the multiple bores.

6. The rennet injection system of claim 5, the nozzle including a middle bore that extends longitudinally through the nozzle and an angled bore that extends angularly through the nozzle.

7. The rennet injection system of claim 6, wherein a pair of angled bores extends through the nozzle.

8. The rennet injection system of claim 7, wherein each angled bore of the pair of angled bores defines an angle of about 45 degrees with respect to the middle bore of the nozzle.

9. A food processing vat system comprising:

a vat having opposing side walls and a top wall that interconnect opposing end walls and that defines a vat center-line along a longitudinal axis extending between the end walls; and a rennet injection system having, a rennet supply line directing rennet toward the vat and extending outside of at least one of the side and top walls of the vat; and multiple injectors aligned with each other along at least one of a longitudinal direction and transverse direction with respect to the vat and receiving rennet from the rennet supply line, wherein each of the multiple injectors has an injector body defining a first portion connected to the rennet supply line and a second portion having multiple openings for delivering rennet to multiple rennet delivery locations within the vat that are spaced from each other and wherein at least some of the multiple rennet delivery locations are generally aligned upon the vat centerline and wherein each injector body of the multiple injectors extends through the at least one of the side and top walls of the vat from the rennet supply line to a location inside of the vat, wherein the multiple openings of the second portion of each injector body are arranged inwardly of the at least one of the side and top walls of the vat and the first portion of the injector body is connected to the rennet supply line in a location that is outwardly of the at least one of the top the side and top walls of the vat, and wherein the multiple openings of the second portion of each injector body are aligned with each other along at least one of longitudinal direction and transverse direction with respect to the vat with the multiple injectors configured to deliver the rennet through the multiple openings of the second portions of the injector bodies into a rennet receiving area defining a generally rectangular outer perimeter extending about a pattern of discrete delivery locations defining generally evenly distributed columns and rows of rennet delivery locations.

10. The food processing vat system of claim 9, wherein the multiple injectors are arranged generally aligned with each other and generally along the vat center-line.

11. The food processing vat system of claim 9, wherein the multiple injectors are arranged in a longitudinal direction with respect to the vat and the multiple openings of each of the multiple injectors are arranged for delivering rennet from the respective injector to multiple rennet delivery locations that are spaced from each other in a transverse direction with respect to the vat.

12. The food processing vat system of claim 11, wherein the multiple openings of the injectors face directions such that rennet is delivered to a first set of discrete locations (i) substantially along the vat center-line and to a second set of discrete locations (ii) on opposing sides of the vat center-line.

13. The food processing vat system of claim 12, wherein the rennet that is delivered on opposing sides of the vat center-line is delivered to locations that are spaced substantially the same distance from the vat center-line.

14. The food processing vat system of claim 9, the vat further comprising a pair of agitator shafts that extend longitudinally between the end walls and are transversely spaced from each other, the injectors extending below the top wall of the vat and a position that is between the pair of agitator shafts so that the injectors deliver rennet to a set of discrete delivery locations that are spaced from each other and are generally aligned in a column that is spaced closer to one of the agitator shafts than to the center-line of the vat.

15. The food processing vat system of claim 14, wherein the injectors deliver rennet into the vat so as to define at least three columns of longitudinally spaced apart rennet delivery locations.

16. The food processing vat system of claim 15, wherein respective rennet delivery locations of the at least three columns align with each other and define rows of transversely spaced apart rennet delivery locations.

17. A food processing vat system comprising:

a vat having opposing side walls and a top wall that interconnect opposing end walls and that defines a vat center-line along a longitudinal axis extending between the end walls; and a rennet injection system having, a rennet supply line directing rennet toward the vat and extending outside of at least one of the side and top walls of the vat; and multiple injectors receiving rennet from the rennet supply line, wherein each of the multiple injectors has an injector body defining a first portion connected to the rennet supply line and a second portion having multiple openings for delivering rennet to multiple rennet delivery locations within the vat that are spaced from each other and wherein at least some of the multiple rennet delivery locations are generally aligned upon the vat center-line and wherein each injector body of the multiple injectors extends through the at least one of the side and top walls of the vat from the rennet supply line to at location inside of the vat, wherein the multiple openings of the second portion of the injector body are arranged inwardly of the at least one of the side and top walls of the vat and the first portion of the injector body is connected to the rennet supply line in a location that is outwardly of the at least one of the top the side and top walls of the vat;

the vat further comprising a pair of agitator shafts that extend longitudinally between the end walls and are transversely spaced from each other, the injectors extending below the top wall of the vat and a position that is between the pair of agitator shafts so that the injectors deliver rennet to a set of discrete delivery locations that are spaced front each other and are generally aligned in a column that is spaced closer to one of the agitator shafts than to the center-line of the vat;

wherein the injectors deliver rennet into the vat so as to define at least three columns of longitudinally spaced apart rennet delivery locations;

wherein respective rennet delivery locations of the at least three columns align with each other and define rows of transversely spaced-apart rennet delivery locations; and wherein distances between the longitudinally spaced apart rennet delivery locations within the columns are generally the same as distances between the transversely spaced apart rennet delivery locations within the rows, such that the rennet injection system distributes the rennet evenly across a rennet receiving area of the vat defined generally by outmost positioned columns and rows of the rennet delivery locations.

* * * * *